United States Patent Office

3,756,965
Patented Sept. 4, 1973

3,756,965
PROCESS FOR THE PREPARATION OF
OXIDATION CATALYSTS
Keishi Yamada, Sumio Umemura, Kyoji Ohdan, Kenichi Miki, and Yasutaka Arima, Ube, Mikio Hidaka, Shimonoseki, and Yasuo Bando, Kazuo Fukuda, and Masao Sawazi, Ube, Japan, assignors to Ube Industries, Ltd., Yamaguchi-ken, Japan
No Drawing. Filed July 21, 1971, Ser. No. 164,809
Claims priority, application Japan, July 24, 1970, 45/64,342
Int. Cl. B01j 11/06, 11/32
U.S. Cl. 252—467         12 Claims

ABSTRACT OF THE DISCLOSURE

A process for the preparation of oxidation catalysts consisting essentially of molybdenum, antimony, bismuth and oxygen, which comprises adding to a dispersion of antimony oxide or bismuth antimonate a solution of a soluble molybdic acid or soluble molybdate and a solution of a soluble bismuth salt, the antimony oxide or bismuth antimonate, the soluble molybdic acid or molybdate, and the soluble bismuth salt being present in such proportions that the atomic percentile ratio of the three components is:

Mo: 5–60%
Sb: 5–70%
Bi: 25–70% forming a co-precipitate by adjusting the pH of the resulting mixture to 1–7; separating the co-precipitate from the mother liquor, washing the co-precipitate; and thereafter calcining the co-precipitate at a temperature ranging from 450 to 650° C.

---

This invention relates to a process for the preparation of improved oxidation catalysts consisting essentially of molybdenum, antimony, bismuth and oxygen, which catalysts are preferably used for the preparation of unsaturated aldehydes, unsaturated nitriles, conjugated diolefins and the like from olefins.

More specifically, this invention relates to a process for the preparation of oxidation catalysts consisting essentially of molybdenum, antimony, bismuth and oxygen, which comprises adding to a dispersion of antimony oxide or bismuth antimonate a solution of molybdic acid or its salt and a solution of a bismuth salt, adjusting the pH of the mixed solution to 1–7, collecting the resulting precipitate, washing the collected precipitate and heat treating it at a temperature ranging from 450 to 650° C.

Many proposals have been heretofore made concerning oxidation catalysts in use for the preparation of unsaturated aldehydes, unsaturated nitriles, conjugated diolefins and the like by the vapor phase catalytic reaction of olefins with oxygen or an oxygen-containing gas and/or ammonia, and various methods for preparing such catalysts have been known.

From, for instance, Japanese patent publication Nos. 10,111/64, 1,806/70 and 7,290/70 it has been known that catalysts consisting essentially of molybdenum, antimony, bismuth and oxygen are useful as catalysts for oxidation of olefins.

However, each of catalysts consisting essentially of molybdenum, antimony, bismuth and oxygen, which are prepared by these known methods, when used for the catalytic oxidation or ammoxidation of propylene, gives only a low conversion of propylene per unit weight of the catalyst. Accordingly, though acrolein or acrylonitrile can be obtained at a relatively high selectivity, the yield of acrolein or acrylonitrile is low. Therefore, in order to obtain acrolein or acrylonitrile at high conversion and high selectivity, it is necessary to prolong the contact time or increase the amount of catalyst used. Consequently, these catalysts are not fully suitable for industrial preparation of acrolein or acrylonitrile at high yields.

Research has been conducted with a view to developing catalysts which can prepare unsaturated aldehydes, unsaturated nitriles, conjugated diolefins and the like from olefins at high conversion, high selectivity and high yield with use of smaller amounts of catalysts, namely for a shorter contact time, than in the case of conventional catalysts, while preventing occurrence of side reactions, and it has been found that catalysts consisting essentially of molybdenum, antimony, bismuth and oxygen, which are prepared in accordance with the specific process that will be detailed hereinbelow, can exhibit high conversion and high selectivity for a short period of contact time, and can attain the object of this invention very easily. Based on this finding, this invention has been developed.

In accordance with this invention, a process is provided for the preparation of oxidation catalysts consisting essentially of molybdenum, antimony, bismuth and oxygen, which comprises adding to a dispersion of antimony oxide or bismuth antimonate a solution of a soluble molybdic acid or soluble molybdate and a solution of a soluble bismuth salt, the antimony oxide or bismuth antimonate, the soluble molybdic acid or molybdate, and the soluble bismuth salt being present in such proportions that the atomic percentile ratio of the three components is Mo: 5–60%
Sb: 5–70%
Bi: 25–70%;

forming a co-precipitate by adjusting the pH of the resulting mixture to 1–7; separating the co-precipitate from the mother liquor; washing the co-precipitate; and thereafter calcining the co-precipitate at a temperature ranging from 450–650° C.

As the antimony oxide to be used in this invention, for example, commercially available antimony trioxide and antimony pentaoxide may be cited. Of course, there a fresh antimony oxide prepared from, for instance, antimony trichloride, antimony pentachloride, antimony oxychloride or antimony hydroxide may also be used. Any bismuth atimonate prepared by a customary method may be used in this invention. An example of the method of preparing bismuth antimonate preferably adopted in this invention is described below.

First, antimony trichloride is dissolved in concentrated hydrochloric acid, and the resulting solution is hydrolyzed by addition of water to form a precipitate, and aqueous ammonia is further added thereto to form antimony trioxide. Then a solution of bismuth nitrate in nitric acid is added to the so formed antimony trioxide, and the mixture is heated at 300–400° C. Thereafter, water is added to the resulting solid and the mixture is kneaded. The kneaded mixture is further heated at a high temperature ranging from 500 to 1100° C. to calcine the same. As a result, bismuth antimonate suitable for practice of the process of this invention is obtained.

It is preferred that the dispersion of such antimony oxide or bismuth antimonate has a concentration, calculated as antimony trioxide, of 1–50%, especially 5–30%.

In forming a dispersion of antimony oxide or bismuth antimonate, it is possible to suspend a powder of antimony oxide or bismuth antimonate in an easily volatile mineral acid such as nitric acid and hydrochloric acid, aqueous ammonia, water, or an organic acid such as acetic acid, but from the economical viewpoint use of water is most advantageous.

As the solution of a soluble molybdic acid or soluble molybdate, solutions prepared by dissolving molybdic acid, ammonium molybdate, sodium molybdate or potassium molybdate into water, a mineral acid such as hydrochloric acid and nitric acid, or an organic acid, such as acetic acid, or aqueous ammonia may be used. Of course, there solutions prepared by dissolving metallic molybdenum or molybdenum oxide ($MoO_3$) into nitric acid, aqueous ammonia or the like may also be used.

It is preferred that the solution of such molybdic acid or molybdate has a concentration, calcualted as molybdenum trioxide ($MoO_3$), of 3–40%, especially 5–30%.

As the solution of a soluble bismuth salt solution prepared by dissolving bismuth nitrate, bismuth chloride, bismuth oxychloride, bismuth sulfate, basic bismuth nitrate [$4BiNO_3(OH)_2·BiO(OH)$], basic bismuth carbonate or other inorganic salt of bismuth, or a bismuthic acid salt such as sodium bismuthate, in water, a mineral acid such as nitric acid and hydrochloric acid or an organic acid such as acetic acid may be used. Of course, solutions prepared by dissolving metallic bismuth or bismuth oxide into nitric acid or the like may also be used. It is preferred that the solution of such soluble bismuth salt has a concentration, calculated as bismuth trioxide, of 1–50%, especially 3–40%.

The proportion of these starting compounds, namely antimony oxide or bismuth antimonate; molybdic acid or its salt; and a bismuth salt, varies depending on the intended use of the catalyst, but generally, they are used in such proportions that the percentile atomic ratio of the three components will be as follows:

Mo: 5–60%, preferably 10–55%
Sb: 5–70%, preferably 5–60%
Bi: 25–70%, preferably 30–65%

The sequence of addition of a solution of a soluble molybdic acid or molybdate and a solution of a bismuth salt to a dispersion of antimony oxide or bismuth antimonate is not critical in this invention, and either of them is added beforehand, or they may be added coincidentally.

In the process of this invention, a solution of a soluble molybdic acid or molybdate and a solution of a bismuth salt are added to a dispersion of antimony oxide or bismuth antimonate, and the mixture is agitated while maintaining the pH of the mixture at 1–7, preferably 2–6. As a result a co-precipitate is formed composed of antimony, molybdenum, bismuth and oxygen. There is no specific mixing condition other than the condition of adjusting the pH within the above range, but in general, it is preferred that the agitation is conducted for 30 minutes to 3 hours at a temperature ranging from room temperature to 90° C. Further, it is desired that in the formation of the co-precipitate the concentration of the solids in the mixture is in the range from 3 to 50%.

It has not been fully determined what reaction occurs during the above mixing or what structure the resulting precipitate has. However, in view of the fact that a $Sb_2O_3$—$MoO_3$ or $Bi_2O_3$—$MoO_3$ type catalyst disclosed in the specification of Australian Patent No. 243,315, or a catalyst composed of a mixture of them gives acrylonitrile only at a selectivity of about 50–60% and a conversion of about 30–40% in the ammoxidation of propylene, it is construed that in the process of this invention some reaction occurs between the molybdic acid or molybdate and the bismuth salt, or that some interaction is brought about between the above two components and antimony oxide or bismuth antimonate.

According to this invention, the so formed co-precipitate is separated from the mother liquor by an optional solid-liquid separating operation, for instance, filtration, centrifugal separation or the like. Then the separated co-precipitate is washed sufficiently with water. This washing may be conducted with use of aqueous ammonia or an aqueous solution of nitric acid according to need.

The important feature of this invention resides in a sufficient washing of the co-precipitate composed of molybdenum, antimony, bismuth and oxygen formed in a great quantity of an aqueous liquid as well as separation of the precipitate from the mother liquor. This operation results in increase of the surface area of the catalyst. In this invention, by adopting such preparation procedures it is possible to obtain a catalyst having excellent catalytic activity and reaction selectivity giving acrylonitrile at a conversion exceeding 80% and a selectivity exceeding 90% in the ammoxidation of propylene for preparing acrylonitrile.

It is generally difficult to obtain a catalyst excellent in both conversion and selectivity in accordance with methods other than the process of this invention. For instance, only a catalyst capable of giving acrylonitrile at a conversion of at most 60% is prepared by the method disclosed in Japanese patent publication No. 1,806/70, namely the method comprising heating ammonium molybdate and antimony trichloride or antimony oxide, blending the resulting mixture with bismuth nitrate, and subjecting the blend to evaporation to dryness until generation of nitrogen oxide ceases. In ordinary methods of preparing such oxidation catalysts, the reaction among catalyst components is conducted in the solid phase. It is therefore a great surprise that oxidation catalysts excellent in both conversion and selectivity can be prepared by the process of this invention in which the catalyst components are reacted in the aqueous phase and the product is recovered in the form of a co-precipitate.

In this invention, it is sufficient that soluble ions that are readily volatilized and removed by the heat treatment conducted at ordinary calcination temperatures, such as $NH_4^+$, $CO_3^=$ and $NO_3^-$, may be washed away until the content in the co-precipitate is less than about 5% by weight. However, it is important that ions that cannot be readily removed by he heat treatment conducted at ordinary calcination temperatures, such as alkali metal ions, e.g., $Na^+$ and $K^+$, and ions that may be bonded to the metallic components of the catalyst to modify the catalyst, such as $SO_4^=$, $Cl^-$ and $Cr^{+++}$, must be removed by washing as much as possible, for instance, until the content in the co-precipitate becomes less than about 0.1% by weight.

In accordance with this invention, the sufficiently washed co-precipitate is calcined at a temperature ranging from 450 to 650° C., preferably from 500 to 600° C. Generally speaking, the calcination time is in the range of from 3 to 20 hours, preferably 5 to 16 hours.

In this invention, a method is adopted of dispersing a carrier coincidentally with antimony oxide or bismuth antimonate, and adding to the dispersion a solution of a soluble molybdic acid or molybdate and a solution of a soluble bismuth salt. This method is advantageous not only in that a catalyst excellent in activity and selectivity can be obtained but also in that a catalyst comprising the active components deposited uniformly on a carrier may be prepared.

As a carrier silica, alumina, alumina-silica, silicates, kaoline, diatomaceous earth, etc. may be cited.

An embodiment of the process of this invention for preparing the above-mentioned catalyst will now be described.

A prescribed amount of antimony oxide or bismuth antimonate optionally together with a carrier is dispersed in water. A solution of ammonium molybdate in aqueous ammonia and an aqueous solution of bismuth nitrate in nitric acid are coincidentally added dropwise to the dispersion. The pH of the mixed liquor is adjusted to 3–4 with use of aqueous ammonia, and it is stirred for about 2 hours and allowed to stand. Then the resulting co-precipitate is washed by decantation using water and it is separated and washed sufficiently with water. Then the washed co-precipitate is dried at about 120° C. for 16 hours and ground and sieved. As a result, the intended catalyst having high activity and selectivity is obtained.

The catalyst prepared according to the process of this invention consists essentially of molybdenum, antimony, bismuth and oxygen. It is desired that the preparation of the catalyst is conducted so that the catalyst contains molybdenum, antimony and bismuth in the following atomic percentile ratio of the three components:

Mo: 5–60%, preferably 10–55%
Sb: 5–70%, preferably 5–60%
Bi: 25–70%, preferably 30–65%

It is permissible that the catalyst contains minute amounts of metals other than molybdenum, antimony and bismuth, such as sodium, potassium, sulfur, phosphorus and arsenic incorporated into the catalyst during the preparation.

The catalyst prepared in accordance with this invention exhibits excellent properties as an oxidation catalyst particularly for preparing unsaturated aldehydes, unsaturated nitriles, conjugated diolefins or the like from olefins, for instance, monoolefins having 3–5 carbon atoms. The catalyst is suitably used for preparing acrolein or methacrolein from propylene or isobutylene, acrylonitrile or methacrylonitrile from propylene or isobutylene, or preparing 1,3-butadiene from 1-butene, cis-2-butene or trans-2-butene, 1,3-pentadiene from trans-2-pentane, or isoprene from 3-methyl-2-butene or 3-methyl-1-butene. Reaction conditions for preparing these compounds are varied to some extent depending on the type of starting olefin and resulting product. However, the reaction is generally conducted under atmospheric pressure, though it is possible to conduct the reaction under elevated or reduced pressure. The reaction temperature is generally 300–550° C., preferably 300–500° C. It is desirable that the amount of oxygen is in the range of from 0.2 to 3.0 moles per mole of the olefin, especially 0.3 to 2.0 moles per mole of the olefin. In the case of the ammoxidation, it is preferred that the amount of ammonia is in the range of from 0.4 to 2.0 moles, especially from 0.5 to 1.5 moles, per mole of the olefin. In conducting the reaction, it is possible to use as a diluent gas a gas substantially inert to the reaction such as water vapor, nitrogen and carbon dioxide. Water vapor contributes to an improvement of selectivity particularly in the case of ammoxidation. Accordingly, it is preferable to use water vapor in an amount of at least 0.5 mole per mole of the olefin.

The size and configuration of catalyst particles are not critical in this invention. It is possible to mold the catalyst into optional forms of optional sizes according to need, for instance, into pellets and granules, and impart a desired strength to the catalyst after sieving.

In the catalyst prepared in accordance with this invention, no difference in catalytic activity occurs due to differences in the molding method. The catalyst of this invention may be used in fluidized, moving and fixed beds, but it is generally advantageous for maintaining the catalytic activity for a long time to use it in the fixed bed.

The process of this invention for preparing catalyst and excellent effects attained by using catalysts prepared in accordance with this invention for oxidation of olefins will now be explained by referring to examples and comparative examples illustrating embodiments where catalyst prepared by methods other than the process of this invention are used.

In Examples and Comparative Examples, the conversion (percent) and the selectivity (percent) are determined by the following formulas:

$$\text{Conversion (percent)} = \frac{\text{Moles of olefin consumed}}{\text{Moles of olefin fed}} \times 100$$

$$\text{Selectivity (percent)} = \frac{\text{Moles of product}}{\text{Moles of olefin consumed}} \times 100$$

EXAMPLE 1

A 1-liter capacity vessel was charged with 7.8 g. of antimony trioxide ($Sb_2O_3$) and 100 cc. of water were added thereto to form an aqueous dispersion. While the dispersion was being stirred, 100 cc. of a solution of 37.3 g. of ammonium molybdate [$(NH_4)_6Mo_7O_{24} \cdot 4H_2O$] in 10% aqueous ammonia and 198 cc. of 128.5 g. of bismuth nitrate [$Bi(NO_3)_3 \cdot 5H_2O$] in 10% aqueous solution of nitric acid were added coincidentally from different vessels to the dispersion dropwise over a period of about 15 minutes. The pH of the mixture was adjusted to 3 with use of aqueous ammonia, and the mixture was agitated for 30 minutes. Then decantation with use of water was repeated three times, and the precipitate was separated by filtration and washed with water. The content of $NH_4NO_3$ left in the precipitate was 0.3% by weight on the dry basis. Then the precipitate was dried at 120° C. for 16 hours and the resulting solid was calcined at 540° C. for 16 hours to form a catalyst. The content of molybdenum, bismuth and antimony, expressed in terms of the percentile atomic ratio of the three components, was Mo: 40%, Bi: 50% and Sb: 10%.

The catalyst was ground and sieved to form particles of 14–20 mesh (Tyler sieve), and 4 cc. of the catalyst were packed in a stainless steel U-figured reaction tube of 8 mm. inner diameter. While the temperature of the inside of the reaction tube was maintained at 450° C., a propylene:ammonia:air:water mixed gas of 1:1:8:2 molar ratio was fed to the reaction tube at a feed rate of 80 cc./min., and the catalytic reaction was effected with the contact time being 3 seconds.

As a result acrylonitrile was obtained at a selectivity of 91.3% with a propylene conversion of 83.6%.

COMPARATIVE EXAMPLE 1

In an evaporation saucer 37.9 g. of ammonia molybdate [$(NH_4)_6Mo_7O_{24} \cdot 4H_2O$] and 12.25 g. of antimony trioxide ($SbCl_3$) were mixed with 31.2 cc. of water and well agitated. Then the mixture was gradually heated to form a paste. Then 13.1 cc. of 28% aqueous ammonia were added to the paste while stirring and the mixture was evaporated to dryness, and the heating was further continued to volatilize and release ammonium chloride. Then the mixture was allowed to stand and cool. Then a solution of 128.5 g. of bismuth nitrate [$Bi(NO_3)_3 \cdot 5H_2O$] and 14 cc. of 60% nitric acid in 40 cc. of water were added to the above mixture, and the resulting mixture was heated to dryness while stirring, and the heating was further continued until generation of a brown gas of nitrogen oxide ceased. The resulting product was allowed to stand and cool, and 30 cc. of water were added thereto to form a paste, which was then gradually heated and dried. The amount of $NH_4NO_3$ left in the product was 7.0% by weight on the dry basis. The dried product was ground and sieved to particles of 10–20 mesh (Tyler standard sieve), and calcined at 540° C. for 16 hours to form a catalyst. The composition of molybdenum, bismuth and antimony in the resulting catalyst, expressed in terms of the percentile atomic ratio of the three components, was Mo: 40%, Bi: 50% and Sb: 10%.

The ammoxidation of propylene was carried out under the same conditions as in Example 1 with use of 4 cc. of the so prepared catalyst.

As a result, acrylonitrile was obtained at a selectivity of 89.9% with a propylene conversion of 39.3%. It is seen that in Comparative Example 1 the conversion of propylene was much lower than that in Example 1.

COMPARATIVE EXAMPLE 2

A catalyst in which the content of molybdenum, bismuth and antimony, expressed in terms of the percentile atomic ratio of the three components, was Mo: 32.5%, Bi: 50% and Sb: 17%, was prepared in the same manner as in Comparative Example 1. The ammoxidation of propylene was carried out under the same conditions as in Example 1 with use of 4 cc. of the so prepared catalyst.

As a result, acrylonitrile was obtained at a selectivity of 91.1% with a propylene conversion of 37.2%.

COMPARATIVE EXAMPLE 3

128.5 g. of bismuth nitrate [$Bi(NO_3)_3 \cdot 5H_2O$] were dissolved in 400 cc. of 5% dilute aqueous nitric acid, and to the solution a solution of 37.3 g. of ammonium molybdate [$(NH_4)_6Mo_7O_{24} \cdot 4H_2O$] in 370 cc. of water was added. Then 8.7 g. of powder of antimony pentaoxide ($Sb_2O_5$) were added to the mixed liquor while stirring. The resulting suspension was evaporated to dryness at 300–400° C. on a sand bath while stirring until generation of nitrogen oxide ceased. The amount of $NH_4NO_3$ left in the resulting solid was 7.1% by weight on the dry basis. The resulting solid was calcined at 550° C. for 6 hours to form a catalyst. The content of molybdenum, bismuth and antimony in the catalyst was, expressed in terms of the percentile atomic ratio of the three components, Mo: 40%, Bi: 50% and Sb: 10%.

The catalyst was ground and sieved to particles of 10–20 mesh (Tyler standard sieve). The ammoxidation of propylene was carried out under the same conditions as in Example 1 with use of 4 cc. of the so prepared catalyst.

As a result acrylonitrile was obtained at a selectivity of 87.5% with a propylene conversion of 34.5%.

EXAMPLE 2

A 1-liter capacity vessel was charged with 7.8 g. of antimony trioxide ($Sb_2O_3$) and 100 cc. of water were added thereto to form a dispersion. 100 cc. of a solution of 37.3 g. of ammonium molybdate

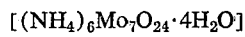

in 10% aqueous ammonia were added to the dispersion. While the mixed liquor was being stirred, 198 cc. of 128.5 g. of bismuth nitrate [$Bi(NO_3)_3 \cdot 5H_2O$] in 10% aqueous solution of nitric acid were added dropwise to the mixed liquor over a period of about 15 minutes, and the pH of the resulting mixture was adjusted to 3 with aqueous ammonia. Then the mixture was stirred for 30 minutes and allowed to stand. The decantation using water was repeated three times, and a precipitate was separated by filtration. The precipitate was washed with water. The amount of $NH_4NO_3$ left in the precipitate was 0.32% by weight on the dry basis. It was then dried at 120° C. for 16 hours. The resulting solid was ground and sieved to particles of 14–20 mesh (Tyler standard sieve), and was calcined at 540° C. for 16 hours to form a catalyst. The content of molybdenum, bismuth and antimony in the catalyst was, expressed in terms of the percentile atomic ratio of the three components, Mo: 40%, Bi: 50% and Sb: 10%.

With use of 4 cc. of the so prepared catalyst, the ammoxidation of propylene was carried out under the same conditions as in Example 1. As a result, acrylonitrile was obtained at a selectivity of 90.1% with a propylene conversion of 79.8%.

EXAMPLE 3

A 1-liter capacity vessel was charged with 7.8 g. of antimony trioxide ($Sb_2O_3$) and 100 cc. of water were added thereto to form a dispersion. 198 cc. of a solution of 128.5 cc. of bismuth nitrate [$Bi(NO_3)_3 \cdot 5H_2O$] in 10% aqueous solution of nitric acid were added to the dispersion. While the mixed liquor was being agitated, 100 cc. of a solution of 37.3 g. of ammonium molybdate [$(NH_4)_6Mo_7O_{24} \cdot 4H_2O$] in 10% aqueous ammonia were added dropwise to the mixed liquor. The pH of the mixture was adjusted to 3 by addition of aqueous ammonia. The mixture was stirred for 30 minutes and allowed to stand. The decantation using water was repeated three times, and the precipitate was separated by filtration. The precipitate was washed with water. The amount of $NH_4NO_3$ left in the precipitate was 0.33% by weight on the dry basis. It was then dried at 120° C. for 16 hours. The resulting solid was ground and sieved to particles of 14–20 mesh (Tyler standard sieve) and calcined at 540° C. for 16 hours. The content of molybdenum, bismuth and antimony was the same as that of the catalyst prepared in Example 1.

With use of 4 cc. of the catalyst, the ammoxidation of propylene was conducted under the same conditions as in Example 1. As a result, acrylonitrile was obtained at a selectivity of 90.3% with a propylene conversion of 78.9%.

EXAMPLE 4

A catalyst was prepared in the same manner as in Example 1 except that the dispersion of antimony trioxide was maintained at 80–90° C. The amount of $NH_4NO_3$ left in the precipitate after washing was 0.29% by weight on the dry basis. With use of 4 cc. of the so prepared catalyst, the ammoxidation of propylene was carried out under the same conditions as in Example 1. As a result, acrylonitrile was prepared at a selectivity of 91.1% with a propylene conversion of 85.6%.

EXAMPLE 5

A catalyst was prepared in the same manner as in Example 1 except that the pH was maintained at 5 with aqueous ammonia while a solution of ammonium molybdate and a solution of bismuth nitrate were added dropwise. The amount of $NH_4NO_3$ left in the precipitate after washing was 0.32% by weight on the dry basis. With use of 4 cc. of the so prepared catalyst, the ammoxidation of propylene was conducted under the same conditions as in Example 1. As a result, acrylonitrile was obtained at a selectivity of 92.3% with a propylene conversion of 83.2%.

EXAMPLE 6

A catalyst was prepared in the same manner as in Example 1 except that the pH was maintained at 2 while a solution of ammonium molybdate and a solution of bismuth nitrate were added dropwise. The amount of $NH_4NO_3$ left in the precipitate after washing was 0.34% by weight on the dry basis. With use of 4 cc. of the so prepared catalyst, the ammoxidation of propylene was carried out under the same condition as in Example 1. As a result, acrylonitrile was obtained at a selectivity of 89.8% with a propylene conversion of 84.3%.

EXAMPLE 7

A catalyst was prepared in the same manner as in Example 1 except that the temperature of calcination of the solid was changed from 540° C. to 600° C. With use of 4 cc. of the so prepared catalyst, the ammoxidation of propylene was carried out under the same conditions as in Example 1. As a result, acrylonitrile was obtained at a selectivity of 92.1% with a propylene conversion of 73.2%.

COMPARATIVE EXAMPLE 4

A catalyst was prepared in the same manner as in Example 7 except that the calcination temperature was changed from 600° C. to 680° C. With use of 4 cc. of the so prepared catalyst the ammoxidation of propylene was carried out under the same conditions as in Example 1. As a result, acrylonitrile was obtained at a selectivity of 79.3% with a propylene conversion of 29.3%.

EXAMPLE 8

A catalyst was prepared in the same manner as in Example 1 except that in order that the percentile atomic ratio of molybdenum, bismuth and antimony in the catalyst would be Mo: 40%, Bi: 55% and Sb: 5%, 100 cc. of a solution of 37.3 g. of ammonium molybdenum [$(NH_4)_6Mo_7O_{24} \cdot 4H_2O$] in 10% aqueous ammonia and 200 cc. of 141.5 g. of bismuth nitrate [$Bi(NO_3)_3 \cdot 5H_2O$] in 10% aqueous nitric acid were coincidentally added dropwise to a dispersion of 3.9 g. of antimony trioxide (Sb$_2$O$_3$) in 100 cc. of water, while the pH was maintained at 3 with aqueous ammonia. The amount of NH$_4$NO$_3$ left in the precipitate after washing was 0.42% by weight on the dry basis. With use of 4 cc. of the so prepared catalyst, the ammoxidation of propylene was carried out under the same conditions as in Example 1. As a result, acrylonitrile was obtained at a selectivity of 88.6% with a propylene conversion of 84.1%.

EXAMPLES 9 TO 15

Catalysts having a percentile atomic ratio of molybdenum, bismuth and antimony indicated in Table 1 were prepared in the same manner as in Example 8 by varying the amounts of antimony trioxide (Sb$_2$O$_3$), ammonium molybdenum [(NH$_4$)$_5$Mo$_7$O$_{24}$·4H$_2$O] and bismuth nitrate [Bi(NO$_3$)$_3$·5H$_2$O] used as indicated in Table 1. With the use of 4 cc. of each of the so prepared catalysts the ammoxidation of propylene was carried out under the same conditions as in Example 1.

Results are shown in Table 1.

TABLE 1

| Example No. | Amount of NH$_4$OH left after washing (wt. percent on dry basis) | Percentrile atomic ratio (percent) | | | Conversion percent of propylene | Selectivity percent of acrylonitrile |
|---|---|---|---|---|---|---|
| | | Mo | Bi | Sb | | |
| 9 | 0.45 | 50 | 25 | 25 | 78.3 | 88.9 |
| 10 | 0.50 | 55 | 50 | 5 | 78.0 | 89.6 |
| 11 | 0.41 | 35 | 40 | 25 | 80.5 | 90.1 |
| 12 | 0.36 | 35 | 30 | 35 | 79.6 | 89.5 |
| 13 | 0.34 | 25 | 40 | 35 | 77.3 | 88.3 |
| 14 | 0.31 | 20 | 55 | 25 | 77.9 | 90.7 |
| 15 | 0.29 | 15 | 40 | 45 | 74.5 | 85.3 |

EXAMPLE 16

A catalyst was prepared in the same manner as in Example 1 except that 8.7 g. of antimony pentaoxide (Sb$_2$O$_5$) were used instead of 7.8 g. of antimony trioxide (Sb$_2$O$_3$). The percentile atomic ratio of molybdenum, bismuth and antimony in the resulting catalyst was Mo: 40%, Bi: 50% and Sb: 10%. With use of 4 cc. of the so prepared catalyst the ammoxidation of propylene was conducted under the same conditions as in Example 1. As a result, acrylonitrile was obtained at a selectivity of 89.8% with a propylene conversion of 86.4%.

EXAMPLE 17

12 cc. of concentrated hydrochloric acid were added to 116 g. of antimony trichloride (SbCl$_3$) to dissolve antimony trichloride, and the solution was hydrolyzed to form a precipitate, to which 76.7 cc. of aqueous ammonia were added to convert it to antimony oxide. The product was separated by filtration and washed with water. The so prepared antimony oxide was charged in an evaporation saucer and a solution of 246 g. of bismuth nitrate [Bi(NO$_3$)$_3$·5H$_2$O] in 46 cc. of 62% nitric acid was added thereto. The mixture was heated to dryness to yield a solid. The solid was calcined at 700° C. for 16 hours. As a result, bismuth antimonate composed mainly of BiSbO$_4$ was obtained.

30 g. of the so prepared bismuth antimonate were charged in a 1-liter capacity vessel together with 100 cc. of water to form an aqueous dispersion. While the dispersion was being stirred, 100 cc. of a solution of 28.1 g. of ammonia molybdate [(NH$_4$)$_6$Mo$_7$O$_{24}$·4H$_2$O] in 10% aqueous ammonia and 150 cc. of a solution of 77.2 g. of bismuth nitrate [Bi(NO$_3$)$_3$·5H$_2$O] in 10% nitric acid were coincidentally added from different vessels to the dispersion dropwise over a period of about 15 minutes. Throughout the dropwise addition, the pH of the mixture was maintained at 3-4. After the dropwise addition, the mixture was stirred for 30 minutes, and decantation using 500 cc. of water was repeated three times. Then the precipitate was separated by filtration, washed with water and dried at 120° C. for 12 hours to form a solid. Then the solid was ground and sieved to particles of 14–20 mesh (Tyler standard sieve) and calcined at 540° C. for 16 hours to form a catalyst. The percentile atomic ratio of molybdenum, bismuth and antimony in the so formed catalyst was Mo: 40%, Bi: 50% and Sb: 10%.

With use of 4 cc. of the catalyst, the ammoxidation of propylene was carried out under the same conditions as in Example 1. As a result, acrylonitrile was obtained at a selectivity of 90.9% with a propylene conversion of 87.6%.

COMPARATIVE EXAMPLE 5

A solution consisting of 54 g. of bismuth nitrate, 10 cc. of 62% nitric acid and 10 cc. of water was added to a solution consisting of 29.5 g. of ammonium molybdate [(NH$_4$)$_6$Mo$_7$O$_{24}$·4H$_2$O] and 50 cc. of water, and the mixed liquor was evaporated to dryness on an evaporation saucer until generation of nitrogen dioxide ceased. The amount of NH$_4$NO$_3$ left in the solid was 6.5% by weight on the dry basis. The resulting solid was packed in a U-figured stainless steel pipe and heated from the outside at 500° C. for 16 hours to calcine the solid, while air was allowed to pass through the tube at a feed rate of 100 cc./min. As a result, bismuth molybdate composed mainly of [Bi$_2$(Mo$_4$)$_3$] was obtained.

The so prepared bismuth molybdate was mixed with the antimony bismuth prepared in the same manner as in Example 17 at a mixing ratio of 20:80. The mixture was kneaded with water by means of pulverizer, and the resulting paste was dried at 130° C. for 16 hours, and ground and sieved to particles of 14–20 mesh (Tyler standard sieve) to form a catalyst.

With the use of 4 cc. of the so prepared catalyst, the ammoxidation of propylene was carried out under the same conditions as in Example 1. As a result, acrylonitrile was obtained at a selectivity of 90.2% with a propylene conversion of 21.3%.

EXAMPLE 18

A 1-liter capacity vessel was charged with 3.9 g. of antimony trioxide (Sb$_2$O$_3$) and 50 g. of kaolin powder, and 200 cc. of water were added thereto to form a dispersion. While the dispersion was being stirred, 50 cc. of a solution of 18.65 g. of ammonium molybdate

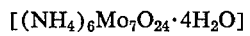

[(NH$_4$)$_6$Mo$_7$O$_{24}$·4H$_2$O]

in 10% aqueous ammonia and 100 cc. of a solution of 64.25 g. of bismuth nitrate [Bi(NO$_3$)$_3$·5H$_2$O] in 10% nitric acid were coincidentally added dropwise to the dispersion over a period of about 15 minutes, during which the pH of the mixture was always maintained at 3–4. After the dropwise addition, the mixture was agitated for 30 minutes and decantation using 500 cc. of water was repeated three times. The precipitate was separated by filtration, washed with water and kneaded for 1 hour by means of a pulverizer. The amount of NH$_4$NO$_3$ left in the precipitate was 0.30% by weight on the dry basis. Then the kneaded precipitate was dried at 120° C. for 16 hours to form a solid. The resulting solid was ground and sieved to particles of 14–20 mesh (Tyler standard sieve), and calcined at 540° C. for 16 hours to form a catalyst. The percentile atomic ratio of molybdenum, bismuth and antimony in the resulting catalyst was Mo: 40%, Bi: 50% and Sb: 10%. The content of kaolin in the catalyst was 50% based on the total weight of the catalyst.

With use of 4 cc. of the so prepared catalyst, the ammoxidation of propylene was conducted under the same conditions as in Example 1. As a result, acrylonitrile was prepared at a selectivity of 87.1% with a propylene conversion of 75.9%.

EXAMPLE 19

A catalyst was prepared in the same manner as in Example 18 except that 50 g. of diatomaceous earth were used as the carrier instead of kaolin powder. The amount of NH$_4$NO$_3$ left after washing was 0.32% by weight on the dry basis. The percentile atomic ratio of molybdenum, bismuth and antimony in the resulting catalyst was the same as that of the catalyst prepared in Example 18.

With use of 4 cc. of the so prepared catalyst, the ammoxidation of propylene was carried out under the same conditions as in Example 1. As a result, acrylonitrile was obtained at a selectivity of 86.9% with a propylene conversion of 77.3%.

EXAMPLE 20

The catalyst prepared in Example 1 was used for the ammoxidation of isobutylene. The ammoxidation was conducted under the same conditions as in Example 1 except that isobutylene was fed instead of propylene and the reaction temperature was changed to 430° C. As a result, methacrylonitrile was obtained at a selectivity of 90.7% with an isobutylene conversion of 85.6%.

EXAMPLE 21

4 cc. of the catalyst prepared in Example 1 were packed in a U-figured stainless steel reaction tube of 8 mm. inner diameter, and the oxidation of propylene was conducted by maintaining the inside temperature at 450° C., feeding a propylene:air:water mixed gas of a molar ratio of 1:6:3 at a feed rate of 80 cc./min. and adjusting the contact time to 3 seconds.

As a result, acrolein was obtained at a selectivity of 87.9% with a propylene conversion of 79.6%.

EXAMPLE 22

The oxidation of isobutylene was carried out in the same manner as in Example 21 except that propylene in the feed gas was replaced by isobutylene.

As a result, methacrolein was prepared at a selectivity of 85.6% with an isobutylene conversion of 85.6%.

EXAMPLES 23 to 27

With use of 4 cc. of the catalyst prepared in Example 1, the dehydroxidation of 1-butene, cis-2-butene, 1-pentene, trans-2-pentene and 3-methyl-1-butene was conducted. The reaction conditions were the same as in Example 1 except that the composition of the feed gas was changed as indicated in Table 2.

Results are shown in Table 2.

TABLE 2

| Example No. | Kind of olefin | Molar ratio of feed gas | | | | Conversion of olefin (percent) | Product | |
|---|---|---|---|---|---|---|---|---|
| | | Olefin | Stream | $O_2$ | $N_2$ | | Conjugated diolefin | Selectivity (percent) |
| 23 | 1-butene | 1 | 1 | 0.6 | 4.4 | 92.3 | 1,3-butadiene | 83.9 |
| 24 | Cis-2-butene | 1 | 1 | 0.6 | 4.4 | 90.1 | do | 84.1 |
| 25 | 1-pentene | 1 | 1 | 0.6 | 9.4 | 72.5 | 1,3-pentadiene | 77.1 |
| 26 | Trans-2-pentene | 1 | 1 | 0.6 | 9.4 | 76.4 | do | 79.1 |
| 27 | 3-methyl-1-butene | 1 | 1 | 0.6 | 9.4 | 76.3 | Isoprene | 76.2 |

EXAMPLE 28

A 1-liter capacity vessel was charged with 7.8 g. of antimony trioxide ($Sb_2O_3$) and 100 cc. of water were added thereto to form an aqueous dispersion. While the dispersion was being stirred, 100 cc. of a solution of 37.3 g. of ammonium molybdate [$(NH_4)_6Mo_7O_{24} \cdot 4H_2O$] in 10% aqueous ammonia and a solution of 27.5 g. of metallic bismuth in 41.3 cc. of concentrated nitric acid were added coincidentally from different vessels to the dispersion dropwise over a period of about 15 minutes. Then, the pH of the mixture was adjusted to 3 with use of aqueous ammonia, and the mixture was agitated for about 30 minutes. Then, the decantation with use of water was repeated three times, and the precipitate was separated by filtration and washed with water. The amount of $NH_2NO_3$ left in the precipitate was 0.30% by weight on the dry basis. Then, the precipitate was dried at 120° C. for 16 hours and the resulting solid was calcined at 540° C. for 16 hours to form a catalyst. The content of molybdenum, bismuth and antimony, expressed in terms of the percentile atomic ratio of the three components, was Mo: 40%, Bi: 50% and Sb: 10%.

The catalyst was ground and sieved to form particles of 14–20 mesh (Tyler sieve), and 4 cc. of the catalyst were packed in a stainless steel U-figured reaction tube of 8 mm. inner diameter. While the temperature of the inside of the reaction tube was maintained at 450° C., a propylene:ammonia:air:water mixed gas of 1:1:8:2 molar ratio was fed to the reaction tube at a feed rate of 80 cc./min., and the catalytic reaction was effected with the contact time being 3 seconds.

As a result, acrylonitrile was obtained at a selectivity of 90.9% with a propylene conversion of 83.6%.

EXAMPLE 29

A catalyst was prepared in the same manner as in Example 28 except that molybdic acid ($H_2MoO_4$) was used instead of ammonium molybdate. The content of molybdenum, bismuth and antimony, expressed in terms of the percentile atomic ratio of the three components, was Mo:40%, Bi:50% and Sb:10%. With use of 4 cc. of this catalyst, the ammoxidation of propylene was carried out under the same conditions as in Example 28. As a result, acrylonitrile was obtained at a selectivity of 90.3% with a propylene conversion of 82.6%.

What we claim is:

1. A process for the preparation of oxidation catalysts consisting essentially of molybdenum, antimony, bismuth and oxygen, which comprises adding to a dispersion of antimony oxide or bismuth antimonate a solution of a soluble molybdic acid or soluble molybdate and a solution of a soluble bismuth salt, said antimony oxide or bismuth antimonate, said soluble molybdic acid or molybdate, and said soluble bismuth salt being present in such proportions that the atomic percentile ratio of the three components is:

Mo:5–60%
Sb:5–70%
Bi:25–70% forming a co-precipitate by adjusting the pH of the resulting mixture to 1–7; separating the co-precipitate from the mother liquor, washing the co-precipitate; and thereafter calcining the co-precipitate at a temperature ranging from 450 to 650° C. for a period of 3–20 hours.

2. The process of claim 1 wherein the bismuth antimonate is prepared by hydrolyzing a solution of antimony trichloride in hydrochloric acid, adding ammonia to the hydrolysis product to form antimony trioxide, adding a solution of bismuth nitrate in nitric acid to the antimony trioxide, heating the mixture at a temperature of 300–400° C., and calcining the resulting solid at a temperature of 500–1100° C.

3. The process of claim 1 wherein the dispersion of antimony oxide or bismuth antimonate has a solid concentration of 1–50% calculated as antimony trioxide.

4. The process of claim 1 wherein the soluble molybdate is ammonium molybdate.

5. The process of claim 1 wherein the solution of a soluble molybdic acid or molybdate has a concentration of 3–40% calculated as molybdenum trioxide.

6. The process of claim 1 wherein the soluble bismuth salt is bismuth nitrate.

7. The process of claim 1 wherein the solution of a soluble bismuth has a concentration of 1–50% calculated as bismuth trioxide.

8. The process of claim 1 wherein the mixture is agitated at a temperature ranging from room temperature to 90° C. for 30 minutes to 3 hours, and the solid concentration of the mixture when forming the coprecipitate is adjusted to 3 to 50%.

9. The process of claim 1 wherein the co-precipitate is formed by adjusting the pH of the resulting mixture to 2-6.

10. The process of claim 1 wherein the washed co-precipitate is calcined at a temperature of from 500–600° C. for a period of 5–16 hours.

11. The process of claim 1 wherein the co-precipitate is washed until the concentration of the ions which cannot be readily removed by the heat treatment conducted at calcination temperatures is less than about 0.1% by weight.

12. An oxidation catalyst consisting essentially of molybdenum, antimony, bismuth and oxygen prepared by a process which comprises adding to a dispersion of antimony oxide or bismuth antimonate a solution of a soluble molybdic acid or soluble molybdate and a solution of a soluble bismuth salt, said antimony oxide or bismuth antimonate, said soluble molybdic acid or molybdate, and said soluble bismuth salt being present in such proportions that the atomic percentile ratio of the three components is:

Mo:5–60%
Sb:5–70%
Bi:25–70% forming a co-precipitate by adjusting the pH of the resulting mixture to 1–7; separating the co-precipitate from the mother liquor, washing the co-precipitate; and thereafter calcining the co-precipitate at a temperature ranging from 450 to 650° C. for a period of 3–20 hours.

References Cited
UNITED STATES PATENTS

| | | | |
|---|---|---|---|
| 3,346,617 | 10/1967 | Hiroki et al. | 252—467 |
| 3,435,069 | 3/1969 | Bethell et al. | 252—467 |
| 3,636,066 | 1/1972 | Yamada et al. | 252—467 |
| 3,641,100 | 2/1972 | Yamada et al. | 252—467 |

WINSTON A. DOUGLAS, Examiner

M. L. BELL, Assistant Examiner

U.S. Cl. X.R.

252—461; 260—465.3